UNITED STATES PATENT OFFICE 2,091,020

METHOD FOR THE PRODUCTION OF METAL NAPHTHENATES

Vladimir L. Shipp, New York, N. Y., assignor to Socony-Vacuum Oil Company Incorporated, New York, N. Y., a corporation of New York No Drawing. Application July 3, 1934, Serial No. 733,613

2 Claims. (Cl. 260—11)

This invention has to do with the recovery of naphthenic acids from waste caustic liquors from petroleum treating, and is specifically directed toward the recovery of those naphthenic acids directly in the form of metal naphthenates, such as lead naphthenates or any of the naphthenates, alone or in combination, of the heavy metals or of alkaline earth metals. These metal naphthenates meet with wide use as drying agents for combination with paint mixtures, and for other industrial uses.

The discarded caustic wash liquors from a plant wherein petroleum fractions have been chemically refined contain many impurities. Besides soaps of naphthenic acids, they may, and as a fact usually do, contain a considerable proportion of hydrocarbons, phenolic compounds, sulphur compounds, sulphuric acid salts, sulphonates, chlorides, and similar impurities in greater or less degree. Due to the presence of these impurities, it has not been deemed possible heretofore to prepare useful naphthenates directly, and the process has been one of separating the naphthenic acid soaps from at least part of the other impurities, liberating and recovering the acid, and then proceeding with the formation of the desired naphthenates. This method usually involves the steps of "salting out" the naphthenic acids as sodium soaps by the addition of strong sodium chloride solution, followed by acidification with sulphuric acid or sulphur dioxide, and finishing with a steam distillation of the naphthenic acids. This method is quite extensive in its demands for equipment, reagents, and supervision, and is somewhat difficult to carry out on a commercial scale, especially if the distillation operation is included, because of difficulties in the distillation. In addition, the spent caustic liquors must usually be concentrated to a high degree before the naphthenic soaps can be separated.

It is therefore an object of this invention to develop direct methods whereby useful naphthenates may be produced from naphthenic acid containing caustic liquors, without the intervention of the steps of separation of the acid by other means.

If the caustic liquor contains appreciable amounts of sulphates capable of reaction with lead salts to form insoluble lead sulphate, and lead naphthenate is the desired product, the liquor must first be freed of such sulphates before practising my processs. I have found that the presence of the other compounds normally present in waste caustic liquors does not hinder the formation of desired naphthenates, and that the production of drying agents for use in the manufacture of paints, varnishes, etc., and of naphthenates for other purposes, may be accomplished by directly processing the waste liquors, provided the concentration of naphthenic acids therein is sufficiently high to make their recovery attractive from an economic standpoint.

Many of the metals and/or alkaline earth metals can be used alone or in combination to combine with naphthenic acids to form driers. For example, I might name lead, manganese, cobalt, chromium, aluminum, zinc, or calcium. For the purposes of an example of my process I may use lead, although it is equally applicable to all, and in mentioning lead herein I do not intend that I shall be restricted to the use of lead alone.

In my preferred process, the waste caustic liquor is first heated to about 200° F. to 212° F. with any suitable means, such as a heating coil, open steam, steam jacket, or the like. This heating is not absolutely necessary, although I prefer it, as it enables carrying out the operations more easily, but it can be omitted if desired. Then a solution of a lead salt in water is added. For this purpose I may use any lead salt capable of undergoing double decomposition with sodium naphthenates, but for the present I prefer lead acetate, both for handling considerations and for cheapness. I may use any concentration of lead salt solution within the range of concentrations sufficiently dilute to permit of double decomposition as desired. The amount of lead salt I add is close to that theoretically required, as calculated from analysis of the caustic liquor for naphthenic acids present, as I have found that the reaction proceeds practically to completion and that waste of either reagent is unnecessary.

If it is desired to form mixed naphthenates, such as lead-manganese naphthenates, the solution added may contain both metals in the desired proportions.

In the exemplary operation, continued, the lead and naphthenic acids combine, as the result of a double decomposition and exchange of radicles, and the resulting metal naphthenate, insoluble in water, separates from the mixture. In the case of lead, the naphthenate at temperatures of reaction set forth above is a liquid, immiscible with water. (Other naphthenates are usually somewhat spongy lumps in form, and usually plastic, although manganese naphthenate is somewhat hard.) The separated naphthenate is then washed with hot, preferably boiling, water by decantation after the reaction liquor has been decanted, and the naphthenate is ready for dehydration.

Dehydration of the separated and washed naphthenates may be accomplished by either of two methods. If lead has been used, or any one of the group cobalt, zinc, aluminum, or chromium, whose naphthenates, like that of lead, do not decompose or discolor on moderate heating, or if the combination of naphthenates be such that it will not discolor on heating, the following procedure is useful. The collected precipitate is removed and heated to a temperature above the boiling point of water, say between 220° F. and 350° F. and held there until dehydrated. At these temperatures, the lead product is liquid, and the complete removal of water is signalled by a cessation of foaming. The resultant product may be clarified by settling, filtration, or centrifuging while heated, or it may be diluted with suitable solvent naphthas and clarified by either method in the dilute form when cold. The product, either concentrated or diluted, is then ready for use.

In the case of naphthenates which can not be heated without loss of color, such as manganese naphthenate, a different method of dehydration is used. A suitable solvent for the naphthenate which is not miscible with water is made use of. For example, I may use "Stoddard solvent" which is a petroleum naphtha boiling between 300° F. and 400° F., or any of a number of similar solvents, which may or may not be petroleum products. A suitable amount of this solvent is added to the separated and washed naphthenate, the naphthenate dissolving in the solvent. Clean separation of the naphthenate solution and water, with consequent dehydration of the naphthenate, can be had by settling, centrifuging or controlled heating, as the naphthenates are more stable in solution. Then the solvent may be removed to a desired degree by suitable distillation, or left in, and the product is ready for use, either in concentrated form, or with original solvent, or the concentrate may be rediluted with other suitable solvents.

I may avoid much of the difficulty of separation and purification by washing, if desired, by the following method, which is especially applicable to those naphthenates which cannot be dehydrated by direct heating, but equally applicable to all naphthenates.

To the reaction mixture I may add a suitable quantity of any solvent, such as the "Stoddard solvent" above spoken of, which is not substantially miscible with water, and in which the naphthenate will dissolve freely enough to enable its substantially complete separation from the reaction mixture. This solvent will free the dissolved naphthenate to a commercial extent from impurities present in the reaction mixture, and the naphthenate may then be dehydrated by heating, or filtration, or centrifuging, and similarly clarified.

In case the solution resulting from the above or other methods is too concentrated or too dilute for commercial use, its concentration may readily be adjusted by dilution or distillation. In case a different solvent is desired, the first may be removed by distillation and replaced.

It is apparent from the above that there are many variations of my method which may be practised under varying circumstances. I regard all of these variations as included in my invention, and desire to be limited only by such limitations as appear in the following claims.

I claim:

1. A method of producing metal naphthenates directly from oil-refinery caustic waste liquors containing alkali metal naphthenates, comprising the steps of heating the caustic liquors to about 200° F., adding thereto an aqueous solution of a salt of a metal capable of forming a water insoluble naphthenate, separating the resulting naphthenate, and dehydrating the resulting naphthenate.

2. A method of producing metal naphthenates directly from oil-refinery caustic waste liquors containing alkali metal naphthenates, comprising the steps of heating the caustic liquors to about 200° F., adding thereto an aqueous solution of a salt of a metal capable of forming a water insoluble naphthenate, extracting the naphthenate so formed from the reaction mixture with a solvent for naphthenates which is not miscible with water, and dehydrating the extract.

VLADIMIR L. SHIPP.